United States Patent [19]

Reichel et al.

[11] Patent Number: 4,482,651

[45] Date of Patent: Nov. 13, 1984

[54] PROCESS FOR THE PREPARATION OF HALOALKOXYMETHYLMELAMINE ADDUCT DISPERSIONS AND POLYURETHANE COMPOSITIONS PREPARED THEREFROM

[75] Inventors: Curtis J. Reichel; John T. Patton, Jr., both of Wyandotte; Thirumurti Narayan, Grosse Ile, all of Mich.

[73] Assignee: BASF Wyandotte Corporation, Wyandotte, Mich.

[21] Appl. No.: 445,817

[22] Filed: Dec. 1, 1982

[51] Int. Cl.$^3$ .................... C08G 18/14; C08G 18/38
[52] U.S. Cl. .................................. 521/115; 521/128; 521/137; 528/53; 528/423; 252/182
[58] Field of Search ............... 521/137, 128, 115; 528/73, 423, 53; 252/182; 544/196, 199

[56] References Cited

U.S. PATENT DOCUMENTS

| | | | |
|---|---|---|---|
| 2,918,452 | 12/1959 | Kun et al. | 544/196 |
| 3,396,209 | 8/1968 | Sekmakas et al. | 544/196 |
| 3,535,318 | 10/1970 | Oppelt et al. | 528/423 |
| 3,707,545 | 12/1972 | Berthold et al. | 544/199 |
| 4,139,501 | 2/1979 | Rudner et al. | 521/115 |
| 4,147,678 | 4/1979 | Mao et al. | 521/115 |
| 4,278,770 | 7/1981 | Chandalia et al. | 521/128 |

Primary Examiner—H. S. Cockeram
Attorney, Agent, or Firm—Norbert M. Lisicki

[57] ABSTRACT

Haloalkoxymethylmelamine adduct is prepared by reacting hexamethoxymethylmelamine with a halogenated alcohol. Dispersions of this adduct in a polyol produce a polyurethane product which displays improved flame retardancy.

9 Claims, No Drawings

PROCESS FOR THE PREPARATION OF HALOALKOXYMETHYLMELAMINE ADDUCT DISPERSIONS AND POLYURETHANE COMPOSITIONS PREPARED THEREFROM

BACKGROUND OF THE INVENTION

1. Field of the Invention

The present invention relates to haloalkoxymethylmelamine adducts, to haloalkoxymethylmelamine adduct dispersions, and to cellular and non-cellular polyurethane products prepared from said haloalkoxymethylmelamine adduct dispersions. More particularly, the invention relates to haloalkoxymethylmelamine adducts, a process for the preparation of haloalkoxymethylmelamine adduct dispersions in polyols, and to cellular and non-cellular polyurethane products with improved flame retardancy prepared employing said dispersions.

2. Description of the Prior Art

U.S. Pat. No. 4,139,501 teaches the preparation of polyurethane foam with enhanced flame retardancy by the reaction of a polyol and an organic polyisocyanate in mixture with a hydroxylmethylmelamine derivative and including therein a halogenated phosphorus ester.

U.S. Pat. No. 4,197,373 teaches the preparation of flame retardant polyurethane foams from a reaction mixture containing the reaction products of melamine and chloral and optionally alkylene oxide adducts thereof. The prior art does not teach the preparation of haloalkoxymethylmelamine polymer compositions.

SUMMARY OF THE INVENTION

The present invention relates to haloalkoxymethylmelamine adduct, to a process for the preparation of dispersible haloalkoxymethylmelamine adduct dispersions of the haloalkoxymethylmelamine adduct in polyols and the improved flame retardant polyurethane products prepared from these haloalkoxymethylmelamine adduct polyol dispersions.

DESCRIPTION OF THE PREFERRED EMBODIMENT

In a suitable solvent, hexamethoxymethylmelamine is reacted with a halogenated alcohol employing an acid catalyst at elevated temperatures. During this reaction, the halogenated alcohol becomes incorporated in the resulting composition via the elimination of methanol from the hexamethoxymethylmelamine. The resulting adduct is filtered, washed with water and dried. The solid adduct is then dispersed in a polyol. Polyurethane products, both cellular and non-cellular, may be prepared from these dispersions by reaction with a polyisocyanate. The polyurethane products exhibit low flammability. The advantages of the instant invention lie in the fact that the adducts are prepared by a single process from readily available starting materials. Compounds such as halogenated phosphates or chloral are not necessary. These adducts may be dispersed in polyols in concentrations of from about 1 percent by weight to about 80 percent by weight, preferably from 5 to 50 percent by weight based on the total weight of adduct plus polyol.

The preferred process for the preparation of a solid haloalkoxymethylmelamine adduct consists of reacting (a) hexamethoxymethylmelamine, (b) a halogenated alcohol containing from 2 to 8 carbon atoms, and at least 1 halogen atom, at temperatures from 25° C. to 120° C., in an organic solvent, in the presence of an acid catalyst, and (c) removing the solid adduct from solution. The starting material may be either hexamethyoxymethylmelamine or a methyl alcohol adduct of the reaction product of melamine and formaldehyde.

Any halogenated, aliphatic alicyclic, aryl, alkaryl, aralkyl alcohol which is capable of reacting with a methoxymethyl group may be employed. These alcohols have the formula $(X)_n R'$—OH wherein R' may be an alkyl containing from 2 to 20 carbon atoms, cycloalkyl containing from 5 to 10 carbon atoms, an aryl, alkaryl, or aralkyl radical containing from 6 to 20 carbon atoms, and X may be chlorine, bromine or iodine and n may range from 1 to 6.

Representative of the types of halogenated alcohols contemplated herein include for example, 2,3-dichloropropanol, 2,3-dibromopropanol, 2,4,4,4-tetrachlorobutanol, 2,2,2-trichloroethanol, 2,2,2-tribromoethanol, 1,1,1,3,3,3-hexachloro-2-propanol, 1,1-dichloro-2-propanol, 1,3-dibromo-2-propanol, 1,1,1-trichloro-2-propanol, 1,1,3,3-tetrabromo-2-propanol, the isomeric tribromophenols, the isomeric tetrachlorophenols, pentachlorophenol, 2-methylol-1,4,5,6,7,7-hexachlorobicyclo-(2.2.1)-5-heptene and the like.

Also, the reaction products of halogenated alkylene oxides and monofunctional active hydrogen compounds are useful in the present invention. Thus, hydroxyl containing compounds such as 1-methoxy-4,4,4-trichloro-2-butanol, 1-ethoxy-3,3,3-trichloro-2-propanol, 2-methoxy-3,3-dichloropropanol and the like may be used. The reaction of the halogenated alcohol with the methoxymethyl group of the hexamethoxymethylmelamine proceeds according to the following reaction:

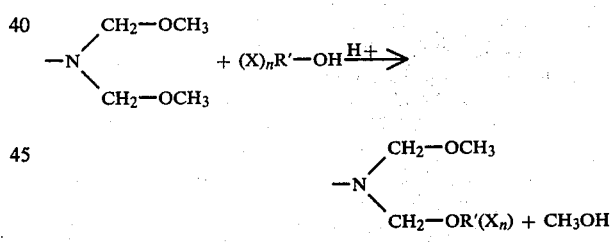

wherein X, n and R' are as defined above. The ratio of halogenated alcohol to hexamethoxymethylmelamine may vary from 1:1 moles to 6:1 moles.

The haloalkoxymethylmelamine adduct dispersions may be prepared by adding the solid adduct to the polyol which is being stirred at a very rapid rate employing an Ultra Turrax mixer. During the mixing operation, the temperature of the dispersions is not allowed to exceed 100° C. The dispersions may also be carried out employing mechanical dispersions equipment such as ball mills and bead mills.

The catalysts which may be employed to promote the reaction include mineral acids such as hydrochloric acid, sulfuric acid, phosphoric acid, aryl and alkyl sulfonic acids, organic carboxylic acids and alkyl phosphoric acid. Preferred is toluene sulfonic acid.

The solvents which may be employed for the preparation of the haloalkoxymethylmelamine adduct are those in which the hexamethoxymethylmelamine are soluble. These include, for example, bromobenzene, o-bromotoluene, N-butylcyclohexane, carbon tetrachloride, chloroform, cyclohexane, cyclohexanone, o-dichlorobenzene, m-dichlorobenzene, p-dichlorobenzene, 1,1-dichloroethane, dichloromethane, 1,1-diethoxybutane, 1,1-diethoxyethane, 1,3-dimethoxybutane, 1,1-dimethoxyethane, 3,3-dimethyl-2-butanone, 3,3-dimethylbutyl acetate, diphenyl ether, m-ethyltoluene, o-ethyltoluene, p-ethyltoluene, propylene dichloride, toluene, 1,1,2-trichloroethane, trichloroethylene, 1,2,3-trichloropropane, m-xylene, o-xylene, and p-xylene.

Typical polyols which may be employed in the preparation of the adduct dispersions of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylene diamine, 1,3-diaminopropane, 1,3-diaminobutane, and 1,4-diaminobutane.

The organic polyisocyanate which may be employed in the instant invention corresponds to the formula $R'(NCO)_z$ where $R'$ is a polyvalent organic radical which is either aliphatic, aryl-alkyl, alkylaryl, aromatic or mixtures thereof and $z$ is an integer which corresponds to the valence of $R'$ and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate (and isomers), 1,5-naphthylene diisocyanate, 1-methoxy-2,4-phenylene diisocyanate, 2,4'-diphenylmethane diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate and mixtures thereof.

In accordance with the present invention, rigid, flexible, and microcellular foams may be prepared by the catalytic reaction of organic polyisocyanates with polyols containing therein the dispersed haloalkoxymethylmelamine adduct in the presence of blowing agents, surfactants and other additives which may be deemed necessary. Non-cellular products may be prepared in the absence of blowing agents.

The polyurethane foams of the present invention may also be prepared by the reaction of an organic polyisocyanate with a graft polymer polyol as taught in U.S. Pat. Nos. 3,652,658; 3,875,258; 3,950,317; and 3,953,393 containing therein the dispersed haloalkoxymethylmelamine polymer of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane products by a prepolymer technique wherein an excess of organic polyisocyanate is reacted in a first step with the polyol containing the haloalkoxymethylmelamine adduct dispersion to prepare a prepolymer having free isocyanate groups which is then reacted in a second step with water to prepare a foam. Alternately, the components may be reacted in a single working step comonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates then does water. These include phenylenediamine, ethylenediamine, diethylenetriamine, N-(2-hydroxypropyl)-ethylenediamine, N,N'-di(2-hydroxypropyl)ethylenediamine, piperazine, 2-methylpiperazine, isophrone diamine, 2,4-diamino-3,5-diethyltoluene and isomers thereof, 3,3',5,5'-tetraisopropyl-4,4'-diaminodiphenylmethane and the like, 4,4'-diaminodiphenylmethane, and 4,4'-diaminodicyclohexylmethane.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

In the examples, the flame retardancy of the foam samples was determined by employing the California Bulletin No. 117 flame test. The specifications to pass this test are: after-flame, maximum 10 seconds, average $\leq 5$ seconds; char length, maximum 8 inches, average $\leq 6$ inches.

Component A is hexamethoxymethylmelamine
Component B is 2,3-dibromopropanol
DABCO WT is a solution of triethylenediamine
T-12 is dibutyltin dilaurate
L-5303 is a silicone surfactant
TDI is toluene diisocyanate (80/20) 2,4-, 2,6-
Crude MDI is polymethylene polyphenylene polyisocyanate Polyol A is a glycerine, propylene glycol, propylene oxide, ethylene oxide, allyl glycidyl ether, adduct containing 15 percent ethylene oxide and having a hydroxyl number of 35.

EXAMPLES 1-5

Into a two-liter, three-neck flask equipped with a stirrer, thermometer and a Dean Stark tube were placed the indicated quantities in Table I of components A and B. In Example 1, 400 mls of toluene and 1.72 gms of toluene sulfonic acid were added. In Examples 2 to 5, 800 mls of toluene and 20 gms of toluene sulfonic acid were added. The contents were heated to reflux temperatures and maintained at that temperature for 6 hours. As a distillate was removed, additional toluene was added. After 8 hours of additional reflux, the flask was cooled to room temperature, the product was filtered, washed with toluene and dried at 100° C. for 24 hours. The yields of product are shown in Table I.

TABLE I

| Example | Component A, g | Component B, g | Yield, g |
|---|---|---|---|
| 1 | 78 | 130.8 | 97 |
| 2 | 156 | 261.6 | 188 |
| 3 | 156 | 261.6 | 209 |
| 4 | 156 | 261.6 | 201 |
| 5 | 156 | 261.6 | 140 |

EXAMPLES 6-8

The product of Example 1 was employed to prepare the dispersion of Example 6. The product of Example 2 was employed to prepare the dispersions of Example 7 and 8. In Example 6, 90 gms of product was dispersed in 360 gms of polyol A employing a high-speed Ultra-Turrax homo-mixer while in Examples 7 and 8, 150 gms of product was dispersed in 600 gms of polyol A as shown in Table II.

TABLE II

| Example | Product of Example, g | Polyol | Viscosity, cps 25° C. | Particle Size $\mu$ |
|---|---|---|---|---|
| 6 | 1, 90 | A, 360 | 1300 | 20-30 |
| 7 | 2, 90 | A, 600 | 1500 | 10-30 |
| 8 | 2, 90 | A, 600 | 1500 | 10-30 |

EXAMPLES 9-12

The polyol or polyol dispersion as indicated in Table III, distilled water, silicone surfactant and DABCO WT catalyst were mixed in a container for 30 seconds using a stirrer. The T-12 was then added and mixed for another 15 seconds. The TDI/crude MDI blend was added, mixed for 5 seconds, and the entire mixture was poured into a one-gallon "cake box." After allowing the foam to rise, it was cured in an oven at 110° C. for 10 minutes. The foam formulation employed was:

| | | |
|---|---|---|
| Polyol Dispersion | 300 | gm |
| Water | 9 | ml |
| DABCO WT | 2.1 | ml |
| T-12 | 0.1 | ml |
| L-5303 | 4.0 | ml |
| TDI/crude MDI (80/20) | 105 | index |

TABLE III

| Example | 9 | 10 | 11 | 12 |
|---|---|---|---|---|
| Dispersion of Example | — | 1 | 2 | 2 |
| Properties | | | | |
| Density, pcf | 1.74 | 1.85 | 1.84 | 1.78 |
| Tensile strength, psi | 21.0 | 10.1 | 10.7 | 8.3 |
| Elongation, % | 167 | 140 | 140 | 127 |
| Tear strength, psi | 1.8 | 1.4 | 0.8 | 0.8 |
| I.L.D., lb./sq. in. | | | | |
| load at 25% defl. | 0.8 | 0.3 | 0.3 | 0.3 |
| 50% | — | 0.5 | 0.6 | 0.6 |
| 65% | 1.8 | 0.9 | 0.9 | 0.9 |
| 25% return | 0.6 | 0.2 | 0.2 | 0.2 |
| Sag factor | 2.42 | 3.03 | 3.03 | 2.91 |
| Guide factor | 0.4 | 0.2 | 0.2 | 0.2 |
| Recovery, % | 76.3 | 64.5 | 63.3 | 71.9 |
| C.L.D., psi | | | | |
| load at 50% defl. | 0.42 | 0.27 | 0.23 | 0.23 |
| Compression set, % | | | | |
| 50% compr. | 19.8 | 47.7 | 76.3 | 59.6 |
| Air flow, cfm at .5" $H_2O$ | 0.50 | 0.54 | 1.10 | 0.65 |
| CFT | | | | |
| Avg. char length, in. | 12.0 | 1.2 | 3.9 | 3.9 |
| Max. char length, in. | 12.0 | 1.9 | 4.2 | 4.1 |
| Avg. afterflame, sec. | 15.9 | 0 | 1.0 | 1.0 |
| Max. afterflame, sec. | 19.8 | 0 | 1.4 | 1.4 |

As indicated in Table III, the foams prepared employing the adduct dispersions of the invention readily pass the California No. 117 flame test as compared to a foam prepared without the dispersions.

The embodiments of the invention in which an exclusive privilege or property is claimed are defined as follows:

1. A process for the preparation of a solid haloalkoxymethylmelamine adduct reacting (a) hexamethoxymethylmelamine, (b) a halogenated alcohol containing from 2 to 20 carbon atoms, and at least 1 halogen atom, at temperatures from 25° C. to 120° C., in an organic solvent, in the presence of an acid catalyst, and (c) removing the solid adduct from solution wherein the mole ratio of halogenated alcohol to melamine is from 1:1 to less than 6:1.

2. The process of claim 1 wherein the acid catalyst is toluene sulfonic acid.

3. The process of claim 1 wherein the halogenated alcohol is 2,3-dibromopropanol.

4. The product of claim 1.

5. The process of claim 1 wherein the mole ratio of halogenated alcohol to melamine is from 1:1 to 5.5:1.

6. A 1 to 80 percent by weight dispersion in a polyol of the adduct prepared by reacting (a) hexamethoxymethylmelamine, (b) a halogenated alcohol containing from 2 to 20 carbon atoms, and at least 1 halogen atom, at temperatures from 25° C. to 120° C., in an organic solvent, in the presence of an acid catalyst, and (c) removing the solid adduct from solution wherein the mole ratio of halogenated alcohol to melamine is from 1:1 to less than 6:1.

7. A cellular polyurethane product prepared by the reaction of an organic, polyisocyanates with the polyol dispersion of claim 6 in the presence of a blowing agent.

8. A non-cellular polyurethane product prepared by the reaction of an organic polyisocyanate with the polyol dispersion of claim 6.

9. The product of claim 6 wherein the mole ratio of halogenated alcohol to melamine is from 1:1 to 5.5:1.

* * * * *